(No Model.)
H. B. KEIPER.
TIRE BENDER.
No. 359,509. Patented Mar. 15, 1887.
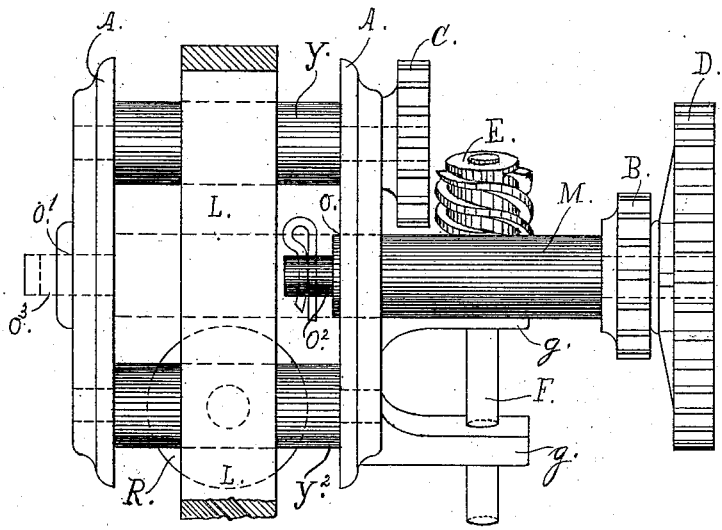
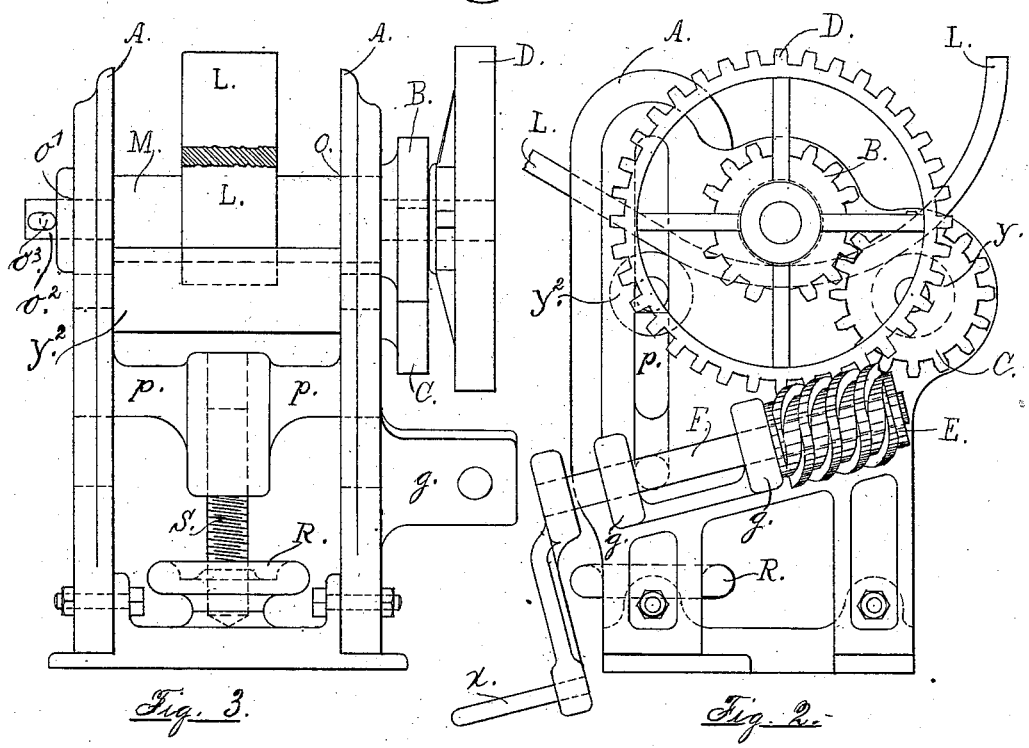
WITNESSES:
INVENTOR
H. B. Keiper

UNITED STATES PATENT OFFICE.

HENRY B. KEIPER, OF LANCASTER, PENNSYLVANIA.

TIRE-BENDER.

SPECIFICATION forming part of Letters Patent No. 359,509, dated March 15, 1887.

Application filed June 29, 1886. Serial No. 206,644. (No model.)

*To all whom it may concern:*

Be it known that I, HENRY B. KEIPER, a citizen of the United States, residing at Lancaster, in the county of Lancaster and State of Pennsylvania, have invented certain new and useful Improvements in Tire-Benders; and I do hereby declare the following to be a full, clear, and exact description of the invention, such as will enable others skilled in the art to which it appertains to make and use the same.

Heretofore tire-benders as made have used spur-gearing, this gearing as applied requiring at least two men on the machine to do the heavy work, and also requiring several sizes of machines to accomplish the various kinds of work.

The object of my improvement is to provide a medium size machine geared in such a manner as to enable one man to operate it alone, and to construct a machine in such a manner that a tire, when bent, can be easily removed from the same. I attain these objects by the mechanism illustrated in the accompanying drawings, similar letters referring to similar parts throughout the several views.

Figure 1 is a top view of the machine with the center roll drawn through the frame to remove the tire. Fig. 2 is a side elevation showing the position of the gearing. Fig. 3 is an end elevation of the same with the worm and its shaft removed.

In Fig. 2, A represents the frame of the machine; B, the spur-gear, which is fast to the center roll and drives the spur-wheel C on the end roll, Y; D, the worm-wheel, which is fast on the shaft of the center roll, M, and is driven by the worm E on the shaft F, which is supported by the bearings $g$, fast to the frame A, L representing the tire being bent.

In Fig. 1 the center roll, M, is shown drawn through its bearing O of the frame A, with the spur-gear and worm-wheel B and D on its end out of gear with the worm E and the spur-wheel C of the end roll, Y. While in this position, as will be seen, the tire L can be easily removed from the machine.

The bearing of the center roll, M, through the frame A, at O in Fig. 3, is of the same diameter as the body of the roll M. The bearing through the frame A at O' is of a diameter to suit the journal $O^2$ of the roll M. When the center roll, M, is in position for work in the frame A, as shown, the journal $O^2$ projects sufficiently through the bearing O' of the frame A to allow a cotter or other suitable device to go through the hole $O^3$, as indicated by the dotted lines, which shall bear against the outside of the frame A and prevent the center roll, M, from working out while in operation.

P represents the cross-head, which supports the journals of the roll $Y^2$; R, the hand-wheel fast to the screw S, by which the cross-head P raises or lowers the roll $Y^2$ to suit the circle of the tire to be bent.

I am aware there is a tire-bender made so as to draw the center roll out to remove the tire similar to the manner I have described by using a loose collar to bush up the bearing O in the frame A, the journals on both ends of their roller M being of the same diameter as my roller M at $O^2$, my improvement in this case consisting in making the center roll, M, of the same diameter as the bearing O through the frame A, avoiding the necessity of bushing this bearing as heretofore, and at the same time allowing the journal upon which the spur-wheel B and the worm-wheel D are keyed to be made of a large diameter, as all the strain of the working of the machine is applied at this point.

By referring to Fig. 2 my principle of obtaining the necessary power to do the work will be seen to be the worm E, rotated by means of the crank X, working in the worm-wheel D, which is keyed fast on the end of the center roll, M, this application of gearing giving all the power necessary for one man to do with a medium size machine what has heretofore required various sizes to accomplish.

Having thus described my improvement, what I desire to secure by Letters Patent is—

1. The worm E, in combination with the worm-wheel D and the spur-gear B and C on a tire-bender, for the purpose herein set forth and described.

2. The bearing O through the frame A, to be of the same diameter as the outside of the roll M, so as to permit the roll M being drawn through the bearing O without the use of bushings, for the purpose set forth, and herein described.

In testimony whereof I affix my signature in presence of two witnesses.

HENRY B. KEIPER.

Witnesses:
  WM. M. OSTEN,
  D. H. KULP.